United States Patent [19]

Newton

[11] Patent Number: 5,465,751
[45] Date of Patent: Nov. 14, 1995

[54] EXCESS FLOW VALVE

[75] Inventor: Edward K. Newton, Westminster, Calif.

[73] Assignee: R.W. Lyall & Company, Inc., Corona, Calif.

[21] Appl. No.: 355,699

[22] Filed: Dec. 14, 1994

[51] Int. Cl.$^6$ .................................................. F16K 17/34
[52] U.S. Cl. ........................ 137/498; 137/517; 137/536
[58] Field of Search ................................... 137/498, 517, 137/536

[56] References Cited

U.S. PATENT DOCUMENTS

| | | |
|---|---|---|
| 469,996 | 3/1892 | Evans . |
| 1,060,142 | 4/1913 | Stevens . |
| 1,164,600 | 12/1915 | Forster . |
| 1,181,435 | 5/1916 | Cartwright . |
| 2,307,949 | 1/1943 | Phillips . |
| 2,352,744 | 7/1944 | Stoddard . |
| 2,917,077 | 12/1959 | Ziege . |
| 3,085,589 | 4/1963 | Sands . |
| 3,200,214 | 8/1965 | Aubert . |
| 3,233,625 | 2/1966 | Pase . |
| 3,468,338 | 9/1969 | Patterson . |
| 3,476,141 | 11/1969 | Tillman .................................. 137/498 |
| 3,618,626 | 11/1971 | Russo .................................. 137/498 X |
| 3,716,069 | 2/1973 | Reynolds . |
| 3,732,889 | 5/1973 | Conery et al. . |
| 4,257,452 | 3/1981 | Hill et al. . |
| 4,362,184 | 12/1982 | Marabeas . |
| 4,383,549 | 5/1983 | Maldavs ............................. 137/498 X |
| 4,765,364 | 8/1988 | Arcari . |
| 4,958,657 | 9/1990 | Hagan et al. . |
| 5,203,365 | 4/1993 | Velie . |

Primary Examiner—Robert G. Nilson
Attorney, Agent, or Firm—Fulwider, Patton, Lee & Utecht

[57] ABSTRACT

An excess flow control valve for telescopical receipt in a cylindrical fluid distribution pipe to control downstream flow therein. The excess flow valve includes a cylindrical pressure reducer fitting for mounting the valve in the pipe and is formed with an upstream facing annular valve seat and a downstream diverging venturi nozzle therethrough. A poppet valve barrel having a central chamber is mounted to the pressure reducer fitting, the chamber formed with a plurality of peripheral inlet flow passages disposed upstream of the fitting and further including at the upstream end thereof, a gland. A poppet having an cylindrical base and an upstream projecting stem is slidably received in the chamber and the stem is received in the gland. The stem includes a stop ring at the upstream end thereof and a compression spring is disposed over the stem in an interposed relationship between the valve barrel and the stop ring to bias the poppet away from the valve seat. As fluid flow increases through the inlet flow passages and out through the venturi nozzle, a pronounced pressure drop is established across the venturi nozzle causing the poppet to be drawn toward and engage the valve seat to close the valve and prevent fluid passage therethrough.

22 Claims, 3 Drawing Sheets

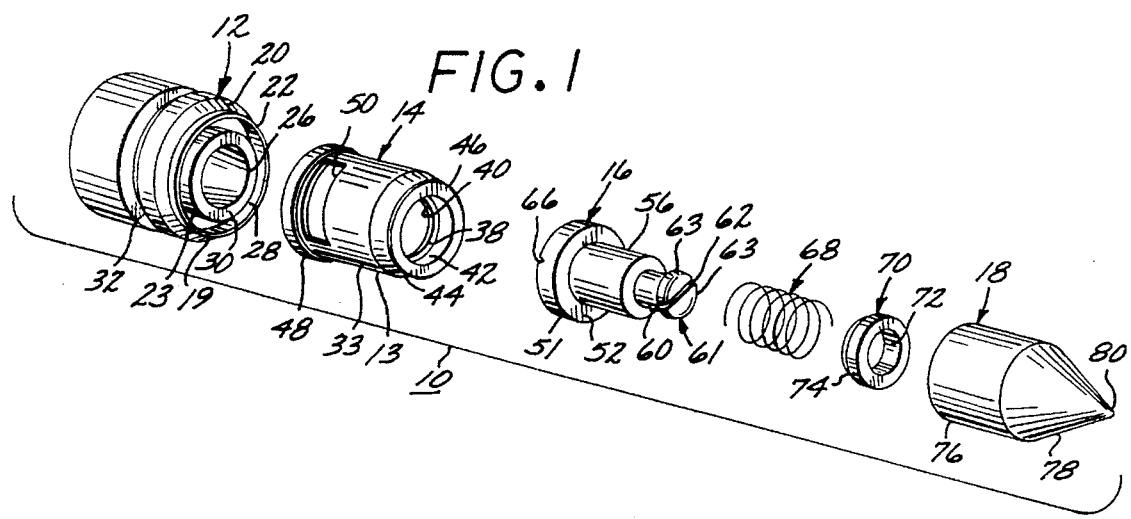
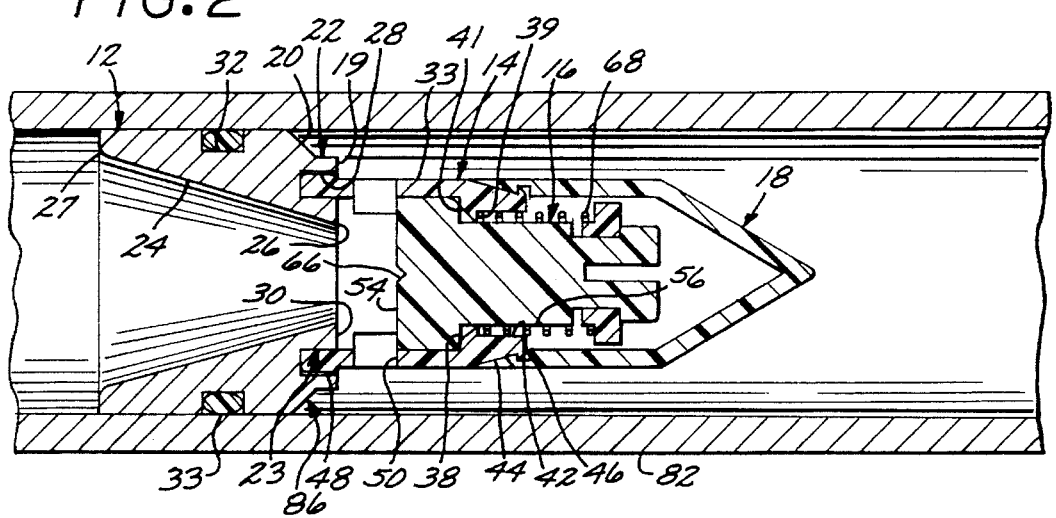
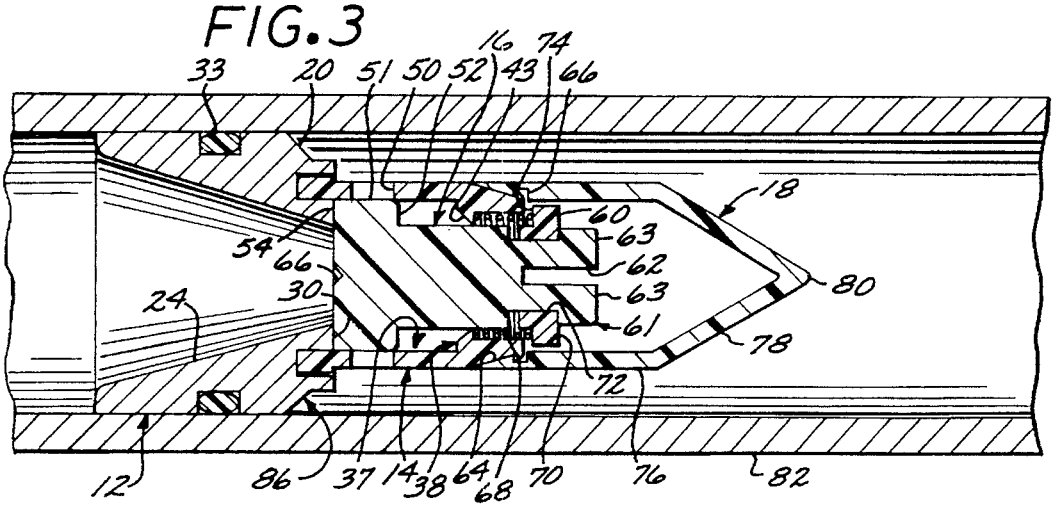

EXCESS FLOW VALVE

BACKGROUND OF THE INVENTION

1. Field of the Invention

The present invention is related to devices for controlling fluid flow through a passage, and more particularly the devices for automatically shutting off fluid flow therethrough.

2. Description of the Prior Art

It is well known that natural gas is a clean and relatively inexpensive fuel source. As such, gas distribution systems have been widely installed throughout the United States and the world. To supply end users, such as commercial and residential consumers, pipelines are typically branched off of a main gas line to provide service to the individual end users. These pipelines are connected to a gas meter and therefrom branched to individual gas appliances and the like.

Because of the high flammability of natural gas, unrestricted escape of gas at the user end caused by the rupture or the severing of a pipeline can create a very hazardous and dangerous situation. Should a large quantity of gas be allowed to escape and fill a confined space, exposure to a spark or ignition source may explosively ignite the gas causing destruction to property and life. Therefore, it is desirable to include safety devices in the gas distribution system that automatically stop or restrict the flow of natural gas should the pipeline burst, a pipe fitting become dislodged, or an event occur causing an excess flow of gas.

Many shut-off devices have been developed over the years, and by way of example, one shut-off device of this type is disclosed in U.S. Pat. No. 4,257,452 to the assignee of the present invention. The shut off device of this type may be telescopically received in a pipeline and includes a poppet valve having a head biased upstream from a valve seat. Flow through the valve is arranged so that it impinges on the head to move the head toward the valve seat and close off fluid flow through the poppet valve when an excess flow condition occurs. Although this arrangement provides effective fluid flow control, the head has a tendency to oscillate under certain flow conditions. Therefore a damping arrangement was included in effort to prevent undue oscillation of the head during operation. Furthermore, when installed in the pipeline, this shut-off device could be misaligned which caused otherwise normal fluid flow across the device to be disturbed leading to possible improper operation of the shut-off device. Although the prior art shut-off valve by such assignee has enjoyed much success in the marketplace, it has been found desirable to provide a shut-off device that has a less complicated construction facilitating ease of assembly, which in turn reduces manufacturing costs, while still maintaining effective excess fluid flow control and shut-off characteristics.

Hence, those skilled in the art have recognized the need for a shut-off device for disposition in fluid distribution pipelines. It is desirable that such device incorporate a minimum number of components to facilitate ease of assembly which, in turn, lowers manufacturing costs. In addition, such a device should be constructed for convenient field installation in new or existing fluid distribution pipelines. The present invention meets these needs and others.

SUMMARY OF THE INVENTION

The invention provides an excess flow valve for telescopical receipt with a fluid distribution pipeline. The excess flow valve may be conveniently installed in the field into new or existing gas distribution lines.

Briefly and in general terms, the excess flow valve includes a cylindrical pressure reducer fitting having a valve seat, a valve barrel mounted to the fitting having a central chamber for receiving a poppet, and a compression spring for biasing the poppet away from the valve seat.

The pressure reducer fitting further includes a venturi nozzle that diverges downstream from the valve seat. The central chamber of the valve barrel includes a plurality of peripheral inlet passages disposed upstream of the pressure reducer fitting. The valve barrel is configured with an upstream abutment ring including a gland formed with a first shoulder facing downstream.

The poppet includes a cylindrical base formed with a downstream facing poppet surface. The base has an upstream projecting stem including a stop ring on its upstream end having a downstream facing second shoulder. The stem is slidably received in the gland of the valve barrel and the base of the poppet is received in the central chamber. The compression spring surrounds the stem and is interposed between the first shoulder of the valve barrel and the second shoulder of the stop ring for biasing the poppet surface away from the valve seat.

In one aspect of the invention, the valve barrel is formed on its upstream end with an outwardly flared retainer lip. A cylindrical shell is provided having an upstream converging conical cowling formed on its upstream end and an annular retaining groove on its downstream end. The shell is configured to surround the stem of the poppet to induce a laminar flow pattern around the barrel of the valve. The retainer lip cooperates with the retaining groove to lock the shell in place relative to the valve barrel.

As gas flows through the peripheral inlet flow passages of the valve barrel and through the venturi nozzle of the pressure reducer fitting, the pressure drops across the nozzle to reduce the pressure on the downstream side of the poppet surface. As such, the poppet surface may be drawn toward the valve seat to reduce the flow rate of gas between the poppet surface and the seat. If an excess flow condition occurs, for instance due to a downstream rupture of the pipeline, the fluid velocity increases through the valve and the pressure across the nozzle further decreases. As the pressure across the nozzle decreases, the poppet surface will be drawn in a downstream direction against the bias of the spring to engage the valve seat and close the flow valve to prevent the further passage of gas therethrough.

In another aspect of the invention, the poppet surface of the poppet includes a reduced-in-diameter downstream projecting extension. When the valve is open, the extension is concentrically disposed within the upstream end of the venturi nozzle to define an annular outlet flow passage whereby gas flows through the valve barrel inlet passages, through the annular outlet and through the venturi nozzle.

In a further aspect of the invention, the poppet surface of the poppet includes a downstream facing sealing member, whereby when the poppet surface has engaged the valve seat, the sealing member prevents leakage of gas past the seat.

In a alternative aspect of the invention, the poppet surface of the poppet is formed with a transverse bleed-by groove, whereby when the poppet surface has engaged the valve seat, a small volume of gas is allowed to bleed by the excess flow valve so that pressure may build downstream of the valve. As such, when the rupture or the like has been repaired, the downstream pressure will gradually increase and equalize the pressure upstream of the valve. When this condition has occurred, the compression spring will overcome the pressure differential across the valve and urge the poppet away from the valve seat to reopen the excess flow valve for normal operation.

Other features and advantages of the invention will become apparent from the following detailed description taken in conjunction with the accompanying drawings, which illustrate by way of example, the features of the invention.

BRIEF DESCRIPTION OF THE DRAWINGS

FIG. 1 is an exploded perspective view of the excess flow valve embodying the present invention;

FIG. 2 is an enlarged assembled sectional side view of the excess flow valve shown in FIG. 1, illustrating the valve in its normally open state;

FIG. 3 is a sectional side view of the excess flow valve shown in FIG. 2, but illustrating the valve in its fully actuated closed state;

DETAILED DESCRIPTION OF THE PREFERRED EMBODIMENT

Figure 4:
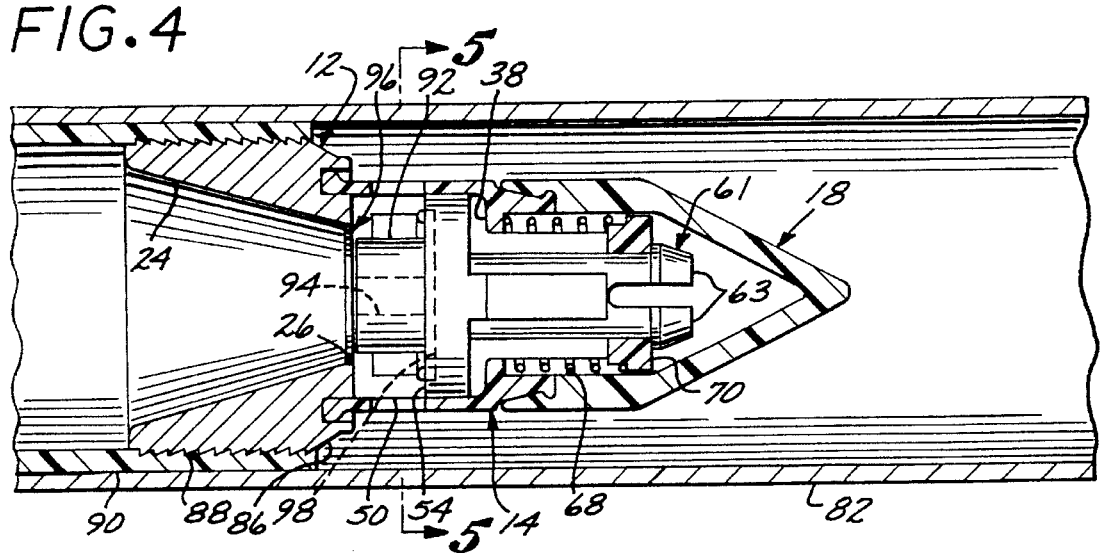
FIG. 4 is an enlarged assembled partial sectional side view of another embodiment of the excess flow valve, similar to that shown in FIG. 2 and illustrating the valve in its normally open state.

As shown in the drawings for purposes of illustration, the invention is embodied in an excess flow valve 10 for use in gas distribution pipelines, the valve operative to shut off flow downstream thereof when the velocity of the gas passing therethrough exceeds a predetermined threshold or, more particularly, when an excess flow condition has occurred downstream causing an abrupt increase in fluid velocity downstream as would be present when the pipeline downstream has ruptured.

The excess flow valve of the invention provides a straight forward, reliable fluid flow control device that may be easily assembled in the factory in a matter of seconds. In addition, the excess flow valve incorporates a minimum number of components so that manufacturing costs are held to a minimum. Furthermore, the construction of the excess flow valve facilitates convenient field installation in a new or existing fluid distribution pipes.

Referring to the drawings and in accordance with the invention, the excess flow valve 10 is of annular construction and, in general, includes a pressure reducer fitting 12, a valve barrel 14, a poppet valve member 16, and a nose cone formed by a hollow shell 18. As shown, the annular pressure reducer fitting 12 is generally cylindrical and is formed at its upstream end with a peripheral frusto-conically converging taper 20 transitioning to a reduced-in-diameter upstream projecting annular skirt 22 which curves radially inwardly at the upstream extremity thereof to form a retaining lip 19. Formed concentric within such skirt 22 is a centering ring 23 which cooperates with such skirt to form an annular nesting groove 28 opening upstream. The upstream face of such centering ring is formed with a flat annular surface defining a valve seat 30. The valve seat is formed radially perpendicular to the central axis of the nozzle and has a smooth finish. The fitting 12 includes an axial frusto conical venturi orifice or nozzle 24 diverging downstream from a throat 26 formed by the centering ring 23. The downstream extremity of the nozzle has a smooth radially outwardly turned radius 27. As shown in FIG. 2, an annular O-ring groove 32 is formed centrally along the outer periphery of the fitting 12 for receipt of an O-ring 29.

The pressure reducer fitting 12 is composed of a metallic alloy, such as aluminum, which provides sufficient rigidity and structural integrity to support the excess flow valve 10 when secured within a fluid distribution pipe. A polymeric material such as polyethylene plastic may be used in the alternative; however aluminum provides better wear resistance, which is desirable especially at the valve seat 30. In addition, such materials are chemically compatible with natural gas to be transported in the pipeline.

The valve barrel 14 is generally in the form of a hollow cylindrical tube having a peripheral wall 33 and formed at its downstream end thereof with an exterior annular locking ring 48 for receipt within the retaining lip 19 of the pressure reducer fitting 12. As shown in FIGS. 2 and 3, the inner bore of the barrel is stepped down centrally to form an annular retainer flange 38 defining a downstream facing shoulder 41 and having a bore 40 therethrough for sliding receipt of the poppet 14. The barrel is formed upstream with a center bore 42 to define at its downstream end an annular shoulder forming a first abutment ring 39. As best shown in FIG. 3, the annular flange 38 further includes a taper 43 converging in the upstream direction from the downstream facing shoulder 41. The cylindrical open volume of the valve barrel, at the downstream end of the annular flange 38, defines a central chamber 37.

The upstream end of the valve barrel 14 includes a peripheral frusto conical forwardly converging abutment taper 44 terminating upstream in an annular radially outwardly flared locking lip 46. A plurality of circumferential elongated rectangularly shaped peripheral inlet flow passages 50 are formed through the peripheral wall 33 at the downstream end of the barrel, upstream of the locking ring 48 for flow of gas radially inwardly therethrough. In the preferred embodiment, a pair of flow passages are provided and are in a diametrically opposed position. The valve barrel 14, in the preferred embodiment is composed of a nylon which can be, formed by convenient manufacturing techniques known well in the art, such as by injection molding.

In the embodiment illustrated in FIGS. 1 and 3, the poppet valve member 16 is an integrally formed body including a large diameter cylindrical base 51 having a stepped down in diameter portion forming an annular shoulder 52 facing upstream and having a flat planar poppet surface 54 facing downstream to be disposed in opposed relation to the skirt 22 of the pressure reducing fitting 12. In one aspect of this embodiment of the poppet valve member, a transverse bleed groove 66 may be formed across the face of the poppet surface. The stepped down portion of such poppet defines a stem 56 which is, in turn, stepped down at its upstream end to form a small diameter neck 60 which is formed at its upstream end with an enlarged split crown 61 configured with a diametrical, longitudinal, relatively wide, slot 62 to form a pair of tines 63.

An annular stop cap ring 70 is formed with an axial bore 72 of a diameter substantially the same diameter as the diameter of poppet neck 60 to be slipped over the crown 61 when the opposite outer sides of the tines 63 thereof are pressed together closing the slot 62 so that upon release thereof such crown will define a stop, holding the ring 70 on the neck 60.

The poppet valve member 16 is composed of semi-rigid resilient polymeric material, such as nylon providing sufficient elastomeric qualities so that the tines 63 making up the crown 61 may be compressed inwardly against the inherent bias to close the slot 62 and reduce the diameter of the crown 61 so that the stop ring 70 can be telescoped thereover.

A stainless steel compression coil spring 68 is provided having an inside diameter sized for concentric receipt over the stem 56 to be sandwiched between the first abutment ring 39 of the valve barrel 14 and the stop ring 70 to thus bias the poppet 16 to its upstream position maintaining the valve in a normally open condition, shown in FIG. 2.

With particular reference to FIG. 3, the shell 18 is generally a hollow open cylinder having a cylindrical wall 76 of the same outside diameter as the peripheral wall 33 of the valve barrel 14. The upstream end of the shell has a conical cowling 78 that converges in an upstream direction to a point 80. The downstream end of the inner cylindrical wall of the shell has a frusto conically forwardly converging surface 64 formed in complementary relationship to the converging abutment taper 44 of the valve barrel 14. The shell, at upstream end of the converging surface 64, is formed with a radially increased-in-diameter annular retaining groove 66. The converging surface 64 transitions to a radially inwardly opening annular locking groove 66 for receipt of the flared locking lip 46 of the valve barrel 14.

The shell 18 is composed of a semi-rigid resilient polymer, such as nylon to provide sufficient elastomeric qualities so that the downstream end of the shell may be deformed radially outwardly over the upstream end of valve barrel lip 46 and snapped resiliently over the lip to securely retain the shell on the valve barrel and provide a positive seal between the shell and the valve barrel 14.

To assemble the excess flow valve 10, the stem 38 of the poppet valve member 12 is slidably received within the valve barrel 14 so that the cylindrical base 51 is received within the central chamber 37, and the stem 56 is received within the gland 40, the upstream end of the stem projecting upstream therefrom. The resilient compression spring 48 is disposed over the stem 56 and within the center bore 42 of the valve barrel. The tines 63 of the crown 61 at the upstream end of the poppet valve member are compressed inwardly about the slot 62 so that a spring stop ring 70 may be telescoped over the upstream end of the poppet valve stem and disposed within the spring stop retaining groove 60 to retain the spring 68 in compressed confronting relationship between the annular shoulder 74 of the stop ring and the annular shoulder 39 of the valve barrel annular flange 38. As such, the poppet valve member is biased in the upstream direction so that the upstream end of the base 51 of the poppet valve member abuts the downstream facing annular shoulder 41 of the valve barrel. The downstream end of the shell 18 is urged over the upstream end 34 of the valve barrel 14 so that the shell retaining groove 66 is and snapped over the flared lip 46 to retain the shell thereon, the converging taper 44 of the valve barrel and the converging surface 64 of the shell disposed in a complementary confronting relationship. The shell encloses the upstream end of the poppet valve member stem 56, the spring 68 and the stop ring 70. Thereafter, the locking ring 48 at the downstream end of the valve barrel is received within the annular nesting groove 28 of the pressure reducer fitting 12 and the skirt 22 of the fitting swaged about the locking ring to securely affix the valve barrel to the fitting. Alternatively, the locking ring 48 may be affixed within the nesting groove using an appropriate adhesive. From the foregoing, it can be appreciated that the excess flow valve may be easily and conveniently assembled in a matter of seconds.

It is to be appreciated that snap assembly design of the stop ring 70 to the poppet 16 as well as the snap design of the shell 18 to the valve barrel 14, in addition to decreasing assembly time, eliminate the possibility of certain manufacturing flaws that may occur using other conventional assembly procedures, such as press fit failure. In addition, the swage connection between the plastic locking ring 48 of the valve barrel 14 and the metallic nesting groove 23 of the pressure reducer fitting 12 provides a positive secure connection therebetween within minimal space constraints, while likewise eliminating the possibility of press fit failure.

The pre-assembled excess flow valve 10 is configured for convenient rapid installation in the field. With reference to FIG. 2, the installation of the excess flow valve can be described hereafter in detail, and by way of example is described for field installation within an existing underground gas distribution pipe. A workman may excavate an access pit around a length of evacuated metallic or polyethylene gas distribution pipe at a location selected where the valve is to be installed. The workman may then sever the pipe to provide two free ends, an upstream end 82 and a downstream end (not shown). An appropriate excess flow valve 10 having a size for telescopical receipt within the pipe is then selected.

Thereafter, the excess flow valve 10 is telescoped into the upstream free end of the pipeline 82 so that the shell 18 projects in an upstream direction into the pipeline. The peripheral surfaces between the reducer fitting 12 and the inner surface of the pipeline may be fastened by press fitting, or in the alternative, fastened together by crimping or through the use of conventional internal self-locking rings. The downstream end and upstream end of the severed pipe 82 may then be reformed, by instance by welding. Thereafter, the excavated pit may be closed and the pipeline brought up to operating pressure and fluid flow therethrough initiated to its normal operating flow rate condition.

With reference to FIGS. 2 and 3, the operation of the excess flow valve 10 will be described hereafter. In normal operating conditions, fluid flows from the upstream pipe 82 and passes over the shell 18 and through the valve barrel flow passages 50 and out through the venturi nozzle 24. It is to be appreciated that in the normally open state, as shown in FIG. 2, that the poppet valve member 16 is biased in the upstream direction by the spring 68 so that the cylindrical base 51 of the poppet is disposed within the central chamber 37 of the valve barrel 14 upstream of the inlet flow passages 50. As such, fluid flow through the inlet passages does not impinge on the periphery or upstream end of the cylindrical base 51 at normal operating flow rates. This improves the laminar flow characteristics of fluid flow through the excess flow valve which enhances smooth operation of the valve and minimizes poppet flutter, while reducing frictional losses that can increase the pressure drop across the valve. In addition, the shape of the conical cowling 78 of the shell 18 further enhances the laminar flow characteristics over the peripheral wall 13 of the valve barrel and through the inlet passages 50, while minimizing total pressure drop across the valve.

During operation, within the normal flow rate design parameters, a venturi pressure drop is experienced at the throat 26 of the venturi nozzle 24. As fluid passes downstream from the throat and within the nozzle, the pressure gradually rises to the match pressure upstream of the valve. The pressure drop at the throat, acts on the downstream poppet surface 54 of the poppet base 51 to cooperate with the upstream pressure in establishing a pressure differential across such poppet tending to urge the poppet valve member 16 in a downstream direction. This force is resisted by the compression spring 68 acting to bias the poppet upstream away from the valve seat 30 of the pressure reducer fitting 12 to maintain the valve in a normally open position. As such, the spring 68 has been selected with a spring constant sufficient to cause the bias force to hold the poppet valve member 16 in its normally open position during normal flow rate design parameters.

However, as the flow rate increases through the throat 26 of the pressure reducer fitting 12 to approach an upper boundary of the normal flow rate design parameters, the pressure further decreases at the venturi throat and on the downstream poppet surface 54 to the point when the pressure differential across such poppet will overcome the spring force of the spring 68 to move the poppet valve member 16 in a downstream direction compressing such spring. As the poppet is drawn toward the valve seat 30, the periphery of the poppet base 51 will partially close the inlet flow passages 50 causing the velocity of the fluid therethrough to increase. This has been defined as an actuation range. At this point, the cumulative flow rate past the poppet has not surpassed an excess flow condition and the poppet has not physically engaged the valve seat 30, and flow may continue to pass through the valve, but at a reduced volumetric flow rate.

As shown in FIG. 3, should flow rate surpass the upper boundary of the normal flow rate design parameters, defining an excess flow condition, the increased pressure drop experience at the throat 26 of the venturi nozzle 22 will serve to further increase the pressure drop across the poppet to fully overcome the bias of the spring 68. The poppet surface 54 will thus engage the valve seat 30 to fully and positively block further fluid flow past the nozzle. For so long as the differential between downstream pressure and upstream static pressure acting across the poppet valve member remains greater than the bias of the spring 68, the poppet surface 54 will remain seated on the valve seat 30. After the rupture has been repaired and the downstream pipeline pressurized to equalize to the upstream pressure, the spring will urge the poppet surface 54 off of the valve seat 30 opening the valve so that gas flow within normal flow design parameters can be resumed.

As described above, in one aspect of the invention, the poppet valve member 16 may include a transverse bleed-by groove 66 formed diametrically across the poppet surface 54. The groove permits a small amount of gas to leak or bleed past the valve seat when the poppet surface of the poppet base 51 is engaged in the closed position against the valve seat 30. After a downstream rupture has been repaired, this bleed-by leakage eventually pressurizes the downstream pipeline to equalize the pressure of the upstream pipeline. As such, the static pressure acting against the upstream surfaces of the poppet valve member 16 is less that the biasing force of the spring 68. When this state has occurred, the spring will expand and the poppet valve member will be retracted to the upstream position shown in FIG. 2. Fluid flow though the valve may now be resumed within normal flow design parameters without having to reset the excess flow valve and without requiring any outside human intervention. This automatic resetting feature makes the valve especially suitable as a protective device in supply lines to gas consumers.

Consumer natural gas often contains fine particulate matter, usually impurities such as fine sand granules. These particulates tend to collect at discontinuities or low flow areas in the flow path, such as where an excess flow valve 10 is disposed in a pipeline. In recognition of such condition, the pressure reducer fitting 12 of the excess flow valve 10 is configured with the upstream converging taper 20 which communicates with the inner surface of the upstream pipe wall 82 to provide a recessed annular particulate collection chamber 86 (FIGS. 2). Such fine particulates collect in the recessed collection chamber away from the valve seat 30 where such particulates could prevent proper operation of the valve upon closure. In addition, because fluid velocity increases across the valve seat 30 due to the increased velocity through the throat 26 of the venturi nozzle 24, particulate collection on the valve seat is minimized. Furthermore, the shell 18, in addition to enhancing laminar gas flow conditions through the valve, prohibits the introduction of particulates and impurities into the sliding surfaces of the poppet 16 and valve barrel 14 which may tend to inhibit the smooth operation of the valve.

Figure 6:
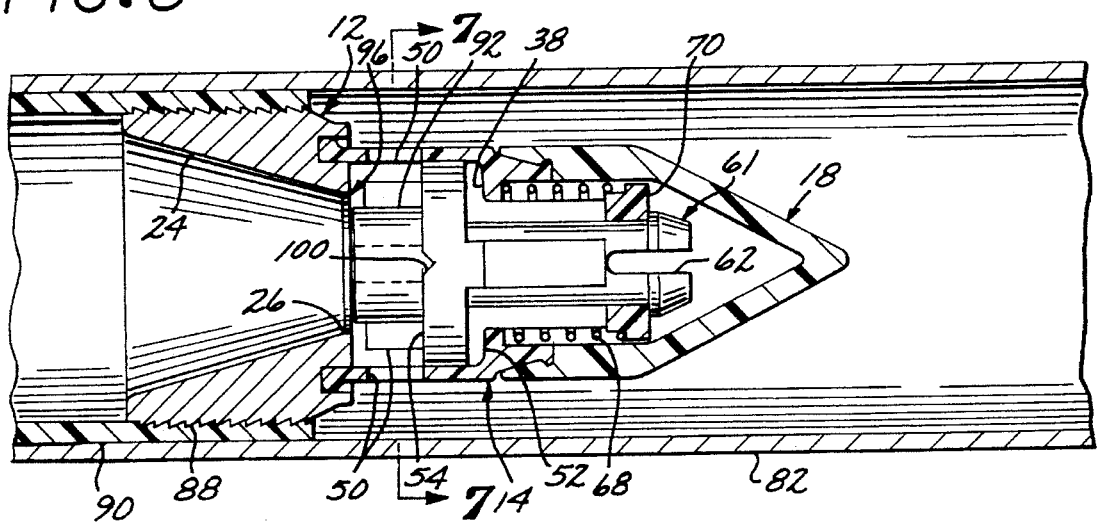
FIG. 6 is an enlarged assembled partial sectional side view of a third embodiment of the excess flow valve, similar to that shown in FIG. 4 and illustrating such valve in its normally open state.
Figure 8:
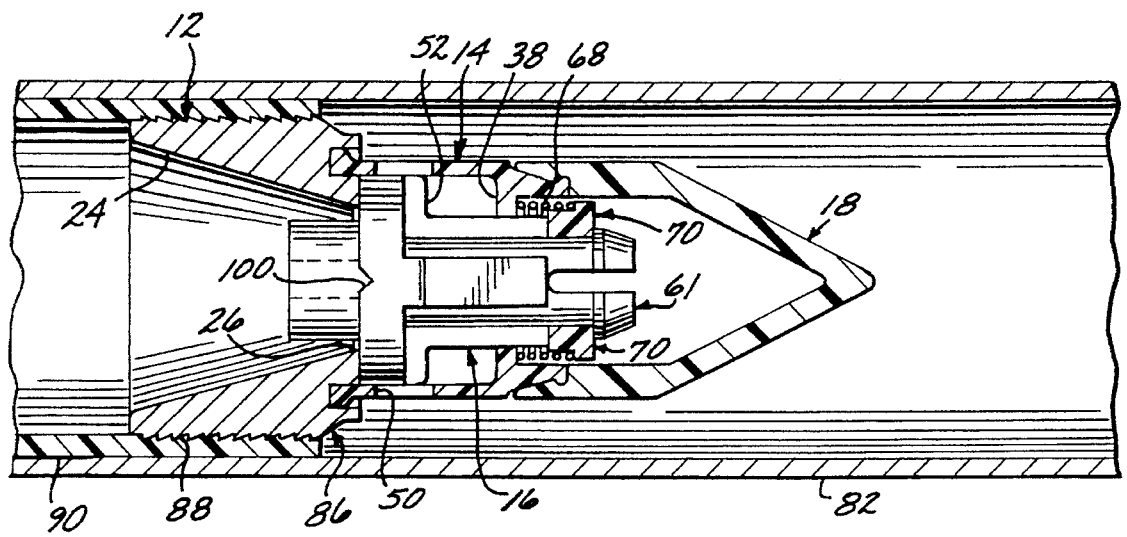
FIG. 8 is a partial sectional side view of the excess flow valve shown in FIG. 6, but illustrating the valve in its fully activated closed state.

In an alternative embodiment as shown in FIGS. 4, 6 and 8, the outer periphery of the pressure reducer fitting 12 may be formed with a plurality of longitudinally spaced apart annular barbs 88. The barbed pressure reducer fitting may be used when the excess flow valve 10 is to be installed within a plastic gas distribution pipe 90 commonly used today in gas distribution systems. In a plastic pipe installation, the plastic pipe is telescoped over the fitting 12 of the excess flow valve, the fitting 12 slightly flaring the plastic pipe radially outwardly forming a flared bell (not shown). The metallic pipe or sleeve 82, having an inside diameter of a size less than the outer diameter of the flared bell, is then telescoped over the excess flow valve 10 and flared bell of the plastic pipe with such force to plasticly deform the plastic pipe radially inwardly, cold flowing the wall of the plastic pipe between the barbs 88 of the fitting 12 to provide a fluid tight joint therebetween.

In the embodiments shown in FIGS. 4 through 9, the poppet valve member 16 includes a reduced-in-diameter cylindrical axial extension 92 projecting in a downstream direction from the poppet surface 54. The cylindrical extension is of a diameter less than the throat 26 of the pressure reducer fitting 12 and includes a central bore 94. As shown in its unactuated state illustrated in FIGS. 4 and 6, the downstream end of the extension 92 is positioned in generally a concentrically aligned relationship relative the upstream end of the throat, the annular space between the cylindrical extension and throat defining an annular flow passage 96.

Figure 5:
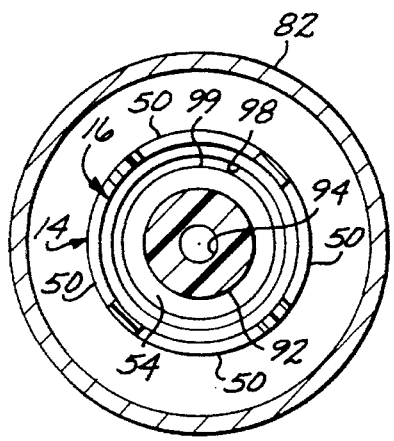
FIG. 5 is a cross sectional view taken along line 5—5 of FIG. 4.
Figure 7:
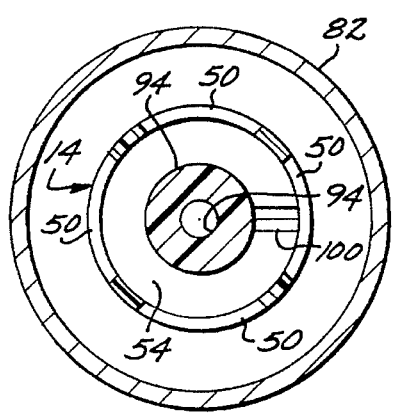
FIG. 7 is a cross sectional view taken along line 7—7 of FIG. 6.

With reference to FIGS. 5 and 7, the valve barrel 14 is formed with four inlet flow passages 50, rather than two as shown above in FIGS. 1 through 3, the four flow passages being equiangularly spaced apart. In this configuration, a more laminar flow pattern may be experienced through the excess flow valve 10 during normal flow conditions.

In one embodiment shown in FIGS. 4 and 5, the poppet surface 54 of the poppet valve member 16 may include a downstream facing annular sealing member groove 98 concentrically spaced radially outwardly from the cylindrical extension 92. The groove 98 is aligned in confronting relationship with the valve seat 30 of the pressure reducer fitting 12. The sealing member groove is sized for receipt of sealing member, such as an O-ring 99, the operation of which to be described below. It is to be appreciated that the poppet surface 54 in the first embodiment described above (FIGS. 1 through 3) may likewise include an annular sealing member groove and O-ring sealing member; however such groove is not shown.

In an alternative embodiment shown in FIGS. 5 and 7, the poppet surface 54 of the poppet valve member 16 may include at least one radial bleed-by groove 100 extending radially outwardly from the cylindrical extension to the periphery of the base 51 of the poppet valve member. Such bleed groove 100 allows a predetermined amount of gas to by-pass the excess flow valve when the valve is operatively closed.

Figure 9:
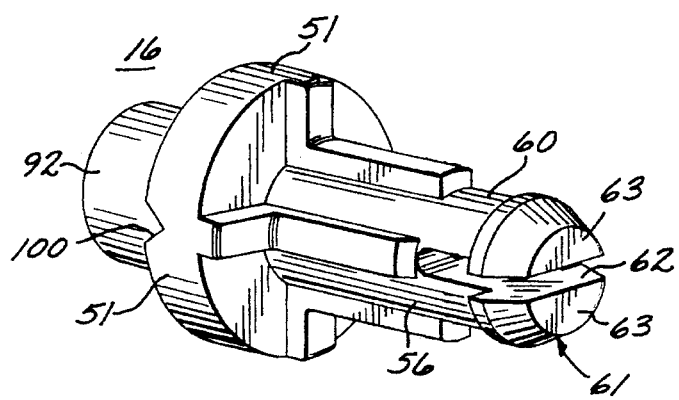
FIG. 9 is an enlarged perspective view of a poppet valve member of the excess flow valve shown in FIG. 6, in accordance with one embodiment of the invention.

With particular reference to FIG. 9, the stem 56 of the poppet valve member 16 may, in one aspect of the invention, include a plurality of equiangularly spaced apart peripheral grooves 102 extending longitudinally from the base 51 to the neck 60 of the stem 56, the raised portions therebetween defining a plurality of longitudinal guide members 104. Preferably, the number of guide members is four and are configured in a cruciform transverse cross-sectional orientation. In this aspect, the annular retainer flange 38 of the valve barrel 14 is formed with a plurality of radial guide slots (not shown) sized for complementary receipt of the guide members 104. As such, the poppet valve member may move axially relative to the valve barrel 14, but is constrained from rotational movement relative to the rotational valve barrel due to the confrontation of the guide members 104 with the guide slots of the valve barrel 14. By preventing rotation of the poppet valve member relative to the valve barrel, it has been found that excess flow valve actuation variability is minimized to provide more controlled operation.

With reference to FIGS. 4, 6 and 8, the operation of the excess flow valve embodiment including the projecting cylindrical extension 92 will be hereinafter described. During normal flow conditions, the valve 10 is in its normally open state (FIGS. 4 and 6). As such, fluid flows over the upstream shell 18 around the valve barrel 14, through the inlet passages 50 thereof, around the periphery of the cylindrical extension 92, and passes through the annular flow passage 96 exiting from the nozzle 24 of the pressure reducer fitting 12. As fluid passes through the reduced-in-area annular passage, the velocity of the fluid increases and the pressure drops across the throat 26 of the nozzle. This pressure drop acts on the poppet surface 54 tending to urge the poppet valve member 16 in the downstream direction. It should be appreciated that the incorporation of the cylindrical extension 92 on the poppet valve member 16 provides a more laminar flow pattern across the throat to further minimize poppet valve flutter and oscillation during normal flow conditions.

Referring more particularly to FIG. 8, as the flow rate is increased above normal design parameters, such as when a downstream rupture has occurred defining an excess flow condition, fluid flows through the annular flow passage 96 between the cylindrical extension 92 and throat 26 of the pressure reducer fitting 12 at an increased velocity. As such, the pressure at the throat and on the poppet surface 54 is further decreased to the point where the pressure differential across the poppet valve member 16 overcomes the biasing spring force of the spring 68. Consequently, the poppet valve member 16 moves in a downstream direction compressing such spring whereby the poppet surface 54 moves into engagement with the valve seat 30 of the pressure reducer fitting 12 closing the valve.

In the embodiment of the invention shown in FIGS. 4 and 5 wherein the poppet surface 54 of the poppet valve member 16 includes the sealing member groove 98 containing the O-ring sealing member 99, the sealing member is compressively engaged between the poppet surface and the valve seat 30 to prevent passage of gas thereacross providing a fluid seal therebetween. As long as the downstream pressure and upstream static pressure differential acting across the poppet valve member remains greater than the bias of the spring 68, the poppet surface 54 and O-ring sealing member will remain seated on the valve seat 30. After the downstream rupture has been repaired and the downstream pipeline pressurized to equalize to the upstream pressure, the spring will urge the poppet surface 54 and O-ring sealing member off of the valve seat 30 opening the valve so that gas flow, within normal flow design parameters, may be resumed.

In the aspect of the invention shown in FIGS. 6 through 9, wherein the poppet valve member 16 includes the radial bleed-by groove 102 across the poppet surface 54, the groove permits a small amount of gas to leak or bleed past the valve seat 30 when the poppet surface is engaged in the closed position against the valve seat 30. After a downstream rupture has been repaired, this bleed-by leakage eventually pressurizes the downstream pipeline to equalize the pressure of the upstream pipeline overcoming the biasing force of the spring 68 so that the spring expands to drive the poppet valve member 16 to its upstream position shown in FIG. 6, opening the excess flow valve 10 for normal operation. As such, fluid flow through the valve may be resumed within normal flow design parameters without having to reset the excess flow valve manually or with outside intervention.

Because the gas utilities supply gas a varying supply pressures and because design flow rates for end users vary, the gas service installer must be able to select excess flow valves having appropriate excess flow actuation ranges for a variety of conditions. Therefore, it is to be appreciated that the construction of the excess flow valve 10 may be altered for different operating flow rates, pressures, and excess flow actuation rates. For instance, the dimensions of the inlet flow passages 50 may be enlarged or reduced for different flow rates to provide different valve actuating characteristics. In addition, the overall dimensions of the various components may be varied for installation in different size distribution pipes. Moreover, the diameter and angle of divergence of the venturi nozzle 24 may be varied to obtain particular pressure drop characteristics across the throat 26 for particular flow rates and pressures. Furthermore, the stiffness of the spring 68 may be changed to provide more or less spring force, so that the valve actuation characteristics may be varied for particular operating flow rates and pressures. Moreover, the tolerances and materials of construction may also be selected for low temperature environments.

Alternatively, it is to be appreciated that the diameter of the cylindrical extension 92 of the excess flow valve 10 may be sized to set selected excess flow actuation ranges or points. The excess flow valve actuation points may be selected based on the relative dimensions of the throat 26 of the pressure reducer fitting 12 and the diameter of the cylindrical extension 92 of the poppet valve member 16 to vary the size of the annular flow passage 96. For instance, if the relative size of the annular flow passage is increased, the velocity of fluid passing therethrough is relatively decreased causing the pressure drop across the throat 26 of the nozzle 24 to be relatively less disparate. As such, a greater volume of fluid must flow through the annular flow passage to cause a large enough pressure drop across the throat to act on the poppet surface 54 and draw the poppet surface towards the valve seat 30 to close the valve. The diameter of the cylindrical extension 92 may be selected to provide a selected valve actuation point for different supply line pressures and flow rates. Because it has been found that different size cylindrical extensions 92 may be manufactured more readily than the other components of the excess flow valve, this method of providing variable selected excess flow valve actuation ranges may be preferable.

In addition, because the dimensions of the cylindrical extension 92 of the poppet valve member 16 may be selectively varied, it has been found that the relative size of the peripheral inlet flow passages 50 of the valve barrel 14 may be enlarged to reduce the pressure drop thereacross. As such, the overall pressure drop across the excess flow valve 10 is reduced during normal operational flow rates.

From the foregoing it can be appreciated that, the excess flow valve 10 of the invention provides a safety fluid flow control device for convenient field installation in new or existing in fluid distribution pipelines. The valve incorporates a minimum number of components to facilitate ease of assembly which, in turn, lowers manufacturing costs. In addition, the valve has a straight forward construction which enhances reliability. Moreover, the overall length of the excess flow valve is relatively short which minimizes the impact of non-laminar flow conditions on the valve.

While particular forms of the invention have been illustrated and described, it will be apparent that various modifications can be made without departing from the spirit and scope of the invention.

What is claimed is:

1. An excess flow control valve for telescopical receipt in a cylindrical housing to control fluid flow downstream thereof and comprising:

a cylindrical pressure reducer fitting for mounting in said housing and formed with an annular seat facing upstream and an axial venturi nozzle diverging downstream from said seat;

a valve barrel mounted from said fitting, upstream thereof and formed with a central chamber including a peripheral wall formed with inlet fluid flow passages disposed upstream of said fitting, said barrel further including an annular flange configured with a first abutment ring facing upstream and including a gland formed with an first annular shoulder facing downstream;

a poppet in said chamber, including a base received in said chamber formed with a second annular shoulder facing upstream for abutting said first shoulder and a poppet surface facing downstream, a stem projecting upstream from said base disposed in said gland, and a stop ring on its upstream end formed with a third annular shoulder facing downstream; and a coil compression spring surrounding said stem and interposed between said first and third shoulders for biasing said poppet away from said seat whereby as fluid flow increases through said inlets said fluid will be caused to flow downstream through said venturi nozzle to establish a pressure drop across said nozzle thereby reducing the pressure on the downstream side of said base causing said spring to contract thereby providing for said poppet surface to be drawn toward said seat to reduce the volumetric flow of fluid between said poppet surface and seat.

2. An excess flow control valve as set forth in claim 1 for closing when the flow therethrough reaches a predetermined rate and wherein:

said poppet and seat are configured to, when said flow reaches said predetermined rate, generate a predetermined pressure differential across said poppet to produce a predetermined force acting in said downstream direction and wherein;

said spring is constructed to, when contracted, produce a bias less than said predetermined force to cause said poppet to close on said seat.

3. An excess flow control valve as set forth in claim 2 wherein:

said poppet surface further includes a transverse groove configured to, when said poppet is closed on said seat, form a bleed passage across said seat whereby when said poppet surface is drawn toward said seat into engagement with the valve seat, said groove permits a small volume of gas to bleed by said valve seat so that the pressure downstream of the excess flow valve may rise above said predetermined pressure thereby providing for said spring to expand and draw said poppet surface away from said valve seat.

4. An excess flow control valve as set forth in claim 1 wherein:

said fitting is formed with an annular nesting groove opening upstream;

said barrel includes a cylindrical body formed with a seating ring for nesting in said nesting groove and formed on its upstream end with an annular outwardly flared retainer lip; and said valve further includes a cylindrical shell surrounding said poppet and configured on its downstream end with a radially inwardly opening annular retaining groove receiving said retaining ring in locking relationship and formed with a conical cowling projecting upstream and tapering inwardly.

5. An excess flow control valve as set forth in claim 1 wherein:

said stem is of a predetermined diameter and is stepped down in diameter to form a neck at the upstream end thereof and which is formed at its upstream end with an enlarged crown of said predetermined diameter, said crown having a central longitudinal slot to define a pair of opposite resilient tines;

said stop ring formed with an axial bore of a diameter less than said predetermined diameter; and whereby said tines may be radially inwardly compressed diametrically to close said longitudinal slot so that said crown is of a diameter less than said predetermined diameter and said stop ring may be telescoped over said crown and said tines thereafter released to expand said crown to said predetermined diameter so that said ring is received in locking relationship in said neck.

6. An excess flow control valve as set forth in claim 1 wherein:

said inlet passages comprise a pair of diametrically opposed circumferentially elongated inlet passages.

7. An excess flow control valve as set forth in claim 1 wherein:

said pressure reducer fitting is formed at its upstream end with a peripheral reduced-in-diameter converging taper downstream of said inlet flow passages to cooperate with said cylindrical housing to form an annular particulate collection chamber whereby particulates contained in the fluid may collect as fluid passes though said valve.

8. An excess flow control valve for telescopical receipt in a cylindrical housing to control fluid flow downstream thereof and comprising:

a cylindrical pressure reducer fitting for mounting in said housing and formed with an annular nesting groove opening upstream and an annular seat facing upstream and an axial venturi nozzle diverging downstream from said seat;

a valve barrel formed with a seating ring on its downstream end for nesting in said nesting groove and formed on its upstream end with an annular outwardly flared retainer lip, said barrel further formed with a central chamber including a peripheral wall formed with inlet passages disposed upstream of said fitting, said barrel further including an annular flange configured with a first abutment ring facing upstream and including a gland formed with an annular shoulder facing downstream;

a poppet in said chamber, including a base received in said chamber formed with a second annular shoulder facing upstream for abutting said first shoulder and a poppet surface facing downstream, a stem projecting upstream from said base disposed in said gland, and a stop ring on its upstream end formed with a third annular shoulder facing downstream;

a coil compression spring surrounding said stem and interposed between said first and second shoulders for biasing said poppet away from said seat;

a cylindrical shell surrounding said poppet and configured on its downstream end with a radially inwardly opening annular retaining groove receiving said retaining ring in locking relationship and formed with a conical cowling projecting upstream and tapering inwardly; and whereby as gas flow is increased through said inlets said gas will be caused to flow downstream through said venturi nozzle to establish a pressure drop across said nozzle thereby reducing the pressure on the downstream side of said base causing said spring to contract thereby providing for said poppet surface to be drawn toward said seat to reduce the volumetric flow of gas between said poppet surface and seat.

9. An excess flow control valve as set forth in claim 8 wherein said valve closes upon said pressure on the downstream side of said base reaching a reduced predetermined pressure and wherein:

said spring is configured and arranged to contract a predetermined distance, whereby when said pressure on the downstream side of said base reduces to said predetermined pressure, said spring contracts said predetermined distance so that said poppet surface engages said seat to prevent fluid flow across said seat.

10. An excess flow control valve as set forth in claim 9 wherein:

said poppet surface further includes a transverse groove whereby when said poppet surface is drawn toward said seat into engagement with the valve seat, said groove permits a small volume of gas to bleed by said valve seat so that the pressure downstream of the excess flow valve may rise above said predetermined pressure thereby providing for said spring to expand and draw said poppet surface away from said valve seat.

11. An excess flow control valve as set forth in claim 8 wherein:

said stem is of a predetermined diameter and is stepped down in diameter to form a neck at the upstream end thereof and which is formed at its upstream end with an enlarged crown of said predetermined diameter, said crown having a central longitudinal slot to define a pair of opposite resilient tines;

said stop ring formed with an axial bore of a diameter less than said predetermined diameter; and whereby said tines may be radially inwardly compressed diametrically to close said longitudinal slot so that said crown is of a diameter less than said predetermined diameter and said stop ring may be telescoped over said crown and said tines thereafter released to expand said crown to said predetermined diameter so that said ring is received in locking relationship in said neck.

12. An excess flow control valve as set forth in claim 8 wherein:

said inlet passages comprise a pair of diametrically opposed circumferentially elongated inlet passages.

13. An excess flow control valve as set forth in claim 8 wherein:

said pressure reducer fitting is formed at its upstream end with a peripheral reduced-in-diameter converging taper downstream of said inlet flow passages to cooperate with said cylindrical housing to form an annular particulate collection chamber whereby particulates contained in the fluid may collect as fluid passes though said valve.

14. An excess flow control valve as set forth in claim 8 wherein:

said nozzle at the upstream end thereof defines an inlet orifice of a predetermined diameter and said poppet further includes a reduced in diameter, downstream projecting, cylindrical extension of a diameter less than said predetermined diameter, the downstream end thereof terminating concentrically within said inlet orifice to define an annular outlet flow passage whereby as fluid flow increases through said inlets, said fluid will be caused to flow downstream through said annular outlet and outward through said nozzle establishing said pressure drop across said nozzle to cause said spring to contract providing for said poppet surface to be drawn toward said seat.

15. An excess flow control valve as set forth in claim 14 wherein:

said poppet surface further includes a radially outwardly extending groove extending from said cylindrical extension to the periphery of said base, said groove configured to, when said poppet is closed on said seat, form a bleed passage across said seat whereby when said poppet surface is drawn toward said seat into engagement with the valve seat, said groove permits a small volume of gas to bleed by said valve seat so that the pressure downstream of the excess flow valve may rise above said predetermined pressure thereby providing for said spring to expand and draw said poppet surface away from said valve seat.

16. An excess flow control valve as set forth in claim 1 wherein:

said poppet surface further includes a downstream facing annular sealing member groove for receipt of a sealing member therein, whereby when said poppet surface is drawn toward said seat, said sealing member is drawn into engagement with said valve seat to seal said poppet surface and said seat to prevent fluid from leaking past said seat.

17. An excess flow control valve as set forth in claim 14 wherein:

said poppet surface further includes a downstream facing annular sealing member groove for receipt of a sealing member therein, whereby when said poppet surface is drawn toward said seat, said sealing member is drawn into engagement with said valve seat to seal said poppet surface and said seat to prevent fluid from leaking past said seat.

18. An excess flow control valve as set forth in claim 17 wherein:

said sealing member comprises an elastomeric O-ring, said O-ring being affixed in said sealing member groove.

19. An excess flow control valve as set forth in claim 1 wherein:

said stem of said poppet further includes a plurality of radially outwardly extending longitudinal guide members; and said annular flange of said valve barrel further includes a plurality of guide slots configured for complementary slidable receipt of said respective plurality of guide members therein whereby confrontation of said slots and said guide members constrains rotational movement of said poppet relative to said valve barrel.

20. An excess flow control valve as set forth in claim 1 for use in a deformable plastic pipe wherein:

the outer periphery of said cylindrical pressure reducer fitting is formed with a plurality of longitudinally spaced apart annular barbs whereby during assembly of said valve, said fitting may be positioned in said deformable plastic pipe and said plastic pipe radially compressed inwardly so that said pipe plasticly deforms between said grooves to form a fluid joint therebetween.

21. An excess flow control valve as set forth in claim 1 wherein:

said cylindrical pressure reducer fitting is formed with a peripheral radially depressed annular sealing member groove; and a radially compressible sealing member is received in said sealing member groove, whereby when said fitting is received in said cylindrical housing, said sealing member provides a fluid seal therebetween.

22. An excess flow control valve as set forth in claim 21 wherein:

said sealing member comprises an elastomeric O-ring, said O-ring being affixed in said sealing member groove.

* * * * *